United States Patent [19]
Young

[11] Patent Number: 4,699,633
[45] Date of Patent: Oct. 13, 1987

[54] METHOD FOR TREATING AN AEROSOL TO REMOVE SUSPENDED PARTICLES THEREFROM

[75] Inventor: Donald C. Young, Fullerton, Calif.

[73] Assignee: Union Oil Company of California, Los Angeles, Calif.

[21] Appl. No.: 658,388

[22] Filed: Oct. 5, 1984

[51] Int. Cl.⁴ ..... B03C 3/00
[52] U.S. Cl. ..... 55/5; 55/10; 55/73; 55/138
[58] Field of Search ..... 55/2, 5, 10, 138, 73, 55/84

[56] References Cited

U.S. PATENT DOCUMENTS

| | | | |
|---|---|---|---|
| 4,162,144 | 7/1979 | Cheney | 55/5 |
| 4,169,714 | 10/1979 | Calvert | 55/5 |
| 4,306,885 | 12/1981 | Kober et al. | 55/5 |
| 4,325,713 | 4/1982 | Rosenberg et al. | 55/73 |
| 4,368,059 | 1/1983 | Doerges et al. | 55/73 |
| 4,475,927 | 10/1984 | Loos | 55/10 |

*Primary Examiner*—Charles Hart
*Attorney, Agent, or Firm*—Michael H. Laird; G. F. Wirzbicki; D. Sandford

[57] ABSTRACT

This invention provides a method for treating an aerosol comprising electrostatically charged particles, suspended in a gas, to separate said particles from said gas, which comprises mixing said aerosol, in the absence of electrostatically charged water particles, with another aerosol including particles having the opposite charge to provide flocculated particles having a substantially neutral charge, and separating said flocculated particles from said gas.

The method of this invention is useful for treating an aerosol emission from a power plant or a smelter which emission generally comprises positively charged particles. The emission may be mixed with a negatively charged aerosol comprising particulate sulfur to neutralize said positively charged particles and thereby flocculate said particulate sulfur. The neutralized particles are passed into a liquid water phase to provide an aqueous solution and flocculated sulfur, which may be separated from said aqueous solution as an insoluble sulfur phase. The separated sulfur may be vaporized to provide a negatively charged aerosol and said negatively charged aerosol reutilized to treat power plant or smelter emissions.

14 Claims, No Drawings

METHOD FOR TREATING AN AEROSOL TO REMOVE SUSPENDED PARTICLES THEREFROM

BACKGROUND OF THE INVENTION

1. Field of the Invention

This invention relates to a method for treating aerosol smokes or fogs to remove the suspended solid or liquid particles from the suspending gaseous phase. This invention is useful in providing a method for treating emissions from a power plant or a smelter, wherein said emissions comprise positively charged particles which are difficult to remove with liquid scrubbers and therefore require electrostatic precipitators—a capital intensive addition to any process for treating the emissions from a power plant or a smelter.

2. Summary of the Art

Suspensions of solid or liquid particles in a gas are known generally as aerosols. In particular, liquid particles formed by condensation or dispersion of a gas are known as aerosol fogs. Solid particles suspended in a gaseous phase are known as aerosol smokes. Aerosol smokes are also usually the result of the condensation of solid particles in a gaseous phase. Aerosols which are formed by condensation process may include very small particles, i.e., less than about 0.1 micron. These particles are generally electrostatically charged and, therefore, due to the size and the electrostatic charge of such particles, it is quite difficult to treat an aerosoi to separate the suspended phase from the gaseous phase.

In view of the above, some of the most intractable pollution emission problems are associated with aerosol smokes and fogs. It is frequently impossible to remove the suspended particles from aerosols with conventional cyclones and scrubbing equipment. It is known that aerosol smokes and fogs may be treated to flocculate the suspended particles through the use of high voltage electrostatic generators which effectively neutralize the charged particles on a charged surface. The flocculated particles, having an increased size, are more easily removed from the gaseous phase than non-flocculated aerosol particles. It is noted, however, that electrostatic precipitators are the most capital intensive of all the control devices for pollution. Also, mechanical, electrical, or process problems can cause poor on-stream time and reliability of such electrostatic precipitators. For example, although electrostatic precipitators are available which either neutralize positive or negative charges, negative polarity discharge electrodes are practically always utilized because high voltages can be obtained without spark over. If a positive polarity discharge electrode must be used, a two stage unit is required.

Another problem with electrostatic precipitators, especially when such precipitator is utilized to treat an aerosol smoke, is that the collected solid particles adhere to the collecting surface. Thus, the collecting surface must be rapped at certain predetermined intervals and intensities to remove the collected dust. This rapping causes further problems since the collected dust may be reentrained in the gas stream. The resistivity of some dusts may also cause electrical problems of arcing and control. Moreover, an aerosol smoke cannot be passed through the electrostatic precipitator at a high velocity without efficiency loss since a high velocity may also cause reentrainment of the collected dust into the moving aerosol smoke. Thus, in designing a process for electrostatic precipitation of an aerosol smoke, an optimum time interval between rapping to remove collected dust, an optimum rapping force and an optimum flow rate must be determined.

The resistivity of the suspended solid phase of the aerosol also is important to an efficient removal process. If the resistivity is too low, there may be a drop in field potential across the collected particulate layer. Also, particulates having a low resistivity may lose their charge to the collecting plate and tumble off randomly and be reentrained in the gaseous phase. However, when the particulate is very conductive, electrostatic precipitators are generally unsatisfactory collection devices. With aerosols having very conductive particles, the precipitator is used only to agglomerate the particles, with the agglomerated particles being trapped downstream from the electrostatic precipitator in a cyclone. This, of course, requires an additional capital investment.

An improvement in the use of electrostatic precipitators to remove suspended particles from aerosols has been made recently. These improved electrostatic precipitators use water sprays to solve some of the conductivity problems noted above. In one variation of this improved process, the water droplets have an impressed charge to assist in collecting the suspended particles. It has been stated that the combination of the water spray and electrostatic precipitation enhances the collection process but there are problems as well as advantages. For example, water can enhance latent corrosion problems and require the use of expensive alloys where carbon steel might be satisfactory in a dry electrostatic precipitator. Moreover, the water utilized must be treated and can cause waste-handling problems. For example, recirculated spray water can be supersaturated with low solubility compounds that build up when the water is returned to the electrostatic precipitator. Suspended solids in the recirculated spray water can also erode or plug nozzles. In view of this, "wet" precipitators have been used generally to date for treating mixtures of gases and submicron particles such as aluminum potline and carbon anode baking fumes, fiberglass fume control, coke oven and metallurgical fumes and phosphate emissions.

It is clear from the above, that an improved method for treating aerosol smokes and fogs to remove the suspended particulate phase from the gaseous phase would be desirable. Therefore, it is one object of this invention to provide a method for treating an aerosol smoke or fog to remove suspended particulate matter from the gaseous phase, which method does not include electrostatic precipitation, alone, or in the presence of a water spray.

It is another object of the instant invention to provide a method for treating the emissions from a power plant or smelter wherein the emission comprises an aerosol smoke having positively charged particles.

Additional objects, advantage, and features of the invention will be come apparent to those skilled in the art from the following description.

SUMMARY OF THE INVENTION

This invention provides a method for treating a first aerosol comprising electrostatically charged particles, suspended in a gas, to separate said particles from said gas which comprises mixing said first aerosol, in the absence of water particles having an impressed charge, with a second aerosol comprising particles having a charge opposite said electrostatically charged particles to provide flocculated particles having a substantially neutral charge, and separating said flocculated particles from said gas. The instant method is especially useful for treating an aerosol emission from a power plant or a smelter.

DETAILED DESCRIPTION OF THE INVENTION

Both positively-charged aerosols and negatively-charged aerosols may be treated by the process of the invention. Moreover, aerosols having both positively and negatively charged particles may be treated by sequential or simultaneous mixing with a second and third aerosol wherein the second and third aerosols are of opposite charge.

Examples of some common aerosols which may be treated by the process of this invention are described in Table 1 below.

TABLE 1

NATURAL CHARGES ON SOME REPRESENTATIVE AEROSOLS

| | Charge Distribution | | | Specific Charge | |
|---|---|---|---|---|---|
| Particle | % Positive | Negative | Neutral | Positive esu | Negative esu |
| Fly Ash | 31 | 26 | 43 | $1.9 \times 10^4$ | $2.1 \times 10^4$ |
| Gypsum dust | 44 | 50 | 6 | 1.6 | 1.6 |
| Copper smelter dust | 40 | 50 | 10 | 0.2 | 0.4 |
| Lead fume | 25 | 25 | 50 | 0.003 | 0.003 |

As will be noted, each of the above aerosols comprise a mixture of positively charged and negatively charged particles, and in only lead fume is the charge balanced. The other aerosols show either a net positive charge (fly ash) or a net negative charge (gypsum dust and copper smelter dust.) In the process of this invention, the positively charged aerosol, fly ash, may be efficiently treated with a negatively charged aerosol, e.g. the above-described gypsum, dust or copper smelter dust, or, more preferably, the sulfur aerosol further described below.

The negatively charged aerosols, gypsum dust and copper smelter dust may be efficiently treated with a positively charged aerosol such as flyash or the aerosol resulting from the decomposition of urea as described below. It is thus clear that the present invention is suitable for treating any charged aerosol by mixing with an aerosol having the opposite charge, under conditions wherein the aerosols particles flocculate to provide particles of substantially neutral charge.

One skilled in the art may determine how to treat any aerosol, even if it is of unknown origin and/or charge, by mixing it sequentially with known aerosols having a positive charge and a negative charge, such as the aerosols described in the present specification, to determine which is more efficient in forming neutral flocculated particles. In some instances, especially if the unknown aerosol comprises a relatively balanced mixture of negatively and positively charged particles, both a negatively and a positively charged aerosol may be required for efficient flocculation of particles.

Certain generalizations may be made when making a decision as to treating an aerosol of known origin, but of unknown charge, by the process of the instant invention.

"Non-metallic elements give positively charged clouds when the finely-divided solid material is blown into a cloud by a current of air. Metallic elements give negatively charged clouds when the finely divided material is blown into a cloud by a current of air. Solid acid-forming oxides give positively charged clouds, and basic oxides negatively charged clouds. In the case of salts the charge apparently depends on the relative strength of adsorption of positive and negative ions." See *Applied Colloid Chemistry: General Theory,* by Bancroft, McGraw-Hill Book Company, Inc. New York, N.Y. 1921.

Since one object of this invention is to avoid the above-described problems that are inherent in electrostatic precipitation in the presence of a water spray, the process is preferably carried out in the absence of water droplets. However, the process may be operated in the presence of water droplets, but to avoid the capital investment in the prior art electrostatic precipitation processes, wherein water droplets having an impressed charge are utilized to assist electrostatic precipitation, the present process is operated in the absence of water droplets having an impressed charge.

The process of this invention is especially useful in treating aerosols found in the environment as pollutants. The aerosol smoke or aerosol fogs which are emitted as pollutants from power plants and smelters generally are positively charged. In the method of the instant invention such positively charged aerosol is mixed with a negatively charged aerosol comprising particulate sulfur to neutralize said positively charged particles in said emission. The positively charged particles and the negatively charged sulfur particles are thereby flocculated to provide agglomerates having a substantially decreased surface area. The neutralized particles from the emission may be passed into a liquid water phase to provide an aqueous solution and flocculated sulfur. The water-insoluble, flocculated sulfur is separated from said aqueous solution as an insoluble sulfur phase. The separated sulfur phase may be vaporized to provide a negatively charged aerosol which is reused to treat a subsequent power plant or smelter emission.

In a pollution control process for treating aerosol emissions containing positively charged particles, the sulfur aerosol may be combined with the emission prior to scrubbing with an aqueous solution or prior to a cyclone. In either event both the sulfur and the positively charged particles are flocculated and are more easily collected by either the aqueous scrubber or the cyclone. Collecting the flocculated particles in a scrubber may be preferred in that the aqueous solution may be utilized to cool the flocculated particles and increase the collection efficiency.

Thus, preferably, the mixing of the sulfur aerosol and the emission is followed by aqueous scrubbing and the sulfur is recovered as an insoluble sulfur phase. The insoluble sulfur phase may be removed from the remaining solution by decantation, filtration, etc., and recycled for use again as the sulfur aerosol.

The invention is further illustrated by the following examples which are illustrative of a specific mode of practicing the invention and are not intended as limiting the scope of the apparatus claims.

EXAMPLE 1

The method of the instant invention will be illustrated by the description of process for treating an aerosol fog, comprising the positively charged decomposition products of urea, with a negatively charged aerosol comprising particulate sulfur. The positively charged aerosol may represent the effluent from a smelter or a power plant since it is known that the emissions from power plants and smelters are generally positively charged particles and are difficult to treat by the use of aqueous scrubbers generally preferred in the pollution control industry. Thus, the owners and operators of power plants and smelters have had to install electrostatic precipitators at a great cost to treat the positively charged emissions prior to aqueous scrubbing.

The positively charged aerosol comprising decomposition products may be generated by heating urea to 100° C. or more in a stream of a wet nitrogen gas. The gas may be cooled, for example, to a temperature of about 30° C. to form a stable aerosol smoke containing particles of urea, ammonium cyanate and ammonium carbonate. This positively charged aerosol smoke is bubbled through a water scrubber and emerges unchanged as a dense white cloud. This demonstrates that the representative positively charged aerosol is not easily removed by aqueous scrubbing—a fact well known to those skilled in the pollution control art.

A sulfur aerosol may be generated by heating sulfur to 200° C. in a stream of dry nitrogen. This aerosol is negatively charged. The aerosol is cooled to approximately 30° C. to provide a stable aerosol smoke of solid sulfur particles. When this aerosol is passed through an aqueous scrubber, it also emerges unchanged.

The above is repeated except that both of the above-described aerosols are simultaneously introduced into the scrubbing zone and the emerging gas is found free of suspended particulate matter, i.e., the aerosols emerge as a particulate-free gas stream. The aqueous scrubbing solution is examined, and it is determined that the decomposition products of urea are dissolved in the water. The sulfur particles are suspended in the water as large agglomerated particles.

EXAMPLE 2

Example 1 is repeated with varying amounts of the first and second aerosol. It is found that equivalent quantities of charges are not required but that a small quantity of sulfur can initiate the flocculation process.

EXAMPLE 3

An aerosol comprising fly ash is subjected to electrostatic precipitation and found to be difficult to collect with 100 percent efficiency. The same aerosol is mixed with an aerosol comprising gypsum dust and the resulting aerosol mixture is found to comprise agglomerated particles of gypsum and fly ash. Such agglomerated particles are substantially neutral and are easily collected by passing said resulting aerosol mixture through an aqueous scrubbing solution.

EXAMPLE 4

The fly ash aerosol of Example 3 is mixed with an aerosol comprising negatively charged sulfur particles in the manner of Example 1. The gas exiting the aqueous scubber is substantially free of sulfur and flyash.

EXAMPLE 5

An aerosol comprising copper smelter dust, such as described in Table 1, is contacted with an aerosol resulting from the decomposition of urea in accordance with Example 1. The gas exiting the aqueous scrubber is substantially free of copper smelter dust and the decomposition products of urea.

While particular embodiments of the invention have been described, it will be understood, of course, that the invention is not limited thereto since many obvious modifications can be made and it is intended to include within this invention any such modifications as will fall within the scope of the appended claims.

What is claimed is:

1. A method for treating a first aerosol comprising electrostatically charged particles, suspended in a gas, to separate said particles from said gas which comprises:

(a) mixing said first aerosol with a second aerosol comprising particles having a charge opposite said electrostatically charged particles, in the absence of particles having an impressed charge, to provide flocculated particles having a substantially neutral charge, and (b) separating said flocculated particles from said gas.

2. The process of claim 1 wherein said first aerosol is selected from the group consisting of gypsum dust, copper smelter dust and sulfur.

3. The process of claim 2 wherein said second aerosol is selected from the group consisting of flyash and the decomposition products of urea.

4. The process of claim 1 wherein said first aerosol is sulfur.

5. The process of claim 4 wherein said second aerosol results from decomposing urea at an elevated temperature.

6. A method for treating a first aerosol wherein said first aerosol comprises a mixture of particles having opposite charges suspended in a gas, to separate said particles from said gas which comprises:

(a) mixing said first aerosol with a second aerosol and a third aerosol, said second aerosol comprising an excess of electrostatically charged particles having a positive charge and said third aerosol comprising an excess of electrostatically charged particles having a negative charge, to provide flocculated particles having a substantially neutral charge, and (b) separating said flocculated particles from said gas.

7. The method of claim 6 further comprising mixing said first aerosol simultaneously with said second and third aerosols.

8. The method of claim 6 further comprising mixing said first aerosol sequentially with said second and third aerosols.

9. The method of claim 6 wherein said first aerosol comprises fly ash, said second aerosol comprises sulfur and said third aerosol comprises urea decomposition products.

10. The method of claim 6 wherein said first aerosol is selected from the group consisting of gypsum dust and copper smelter dust, said second aerosol comprises sulfur, and said third aerosol comprises urea decomposition products.

11. A method for treating an emission from a power plant or a smelter, wherein said emission includes an aerosol smoke comprising positively charged particles, which method comprises:

(a) mixing said emission with a negatively charged aerosol comprising particulate sulfur to neutralize said positively charged particles and flocculate said particulate sulfur, (b) dissolving said neutralized particles in a liquid water phase to provide a solution, (c) separating said flocculated sulfur from said solution as an insoluble sulfur phase.

12. The method of claim 11 wherein said separated sulfur is evaporated to form said negatively charged aerosol and said negatively charged aerosol is recycled for mixing with said emission.

13. A method for treating a first aerosol smoke comprising particulate sulfur to separate said sulfur therefrom which comprises:

(a) mixing in a scrubbing zone and in the presence of a liquid water phase, said first aerosol smoke with a second aerosol smoke comprising the particulate decomposition products of urea, said second aerosol smoke being generated by (i) heating urea at an elevated temperature in a stream of a wet inert gas to partially decompose said urea and thereby provide a vapor comprising urea, ammonium cyanate and ammonium carbonate, and (ii) cooling said vapor to provide said second aerosol smoke;

(b) removing said sulfur as flocculated particles from said scrubbing zone; and (c) removing said decomposition products of urea as a solution comprising said liquid water phase.

14. The method of claim 13 wherein said removed sulfur is evaporated to provide said first aerosol smoke.

* * * * *